L. BILLÉ.
PIPE JOINT.
APPLICATION FILED JUNE 28, 1907.

928,896.

Patented July 20, 1909.

Fig.2¹.

Witnesses:

Inventor
Leon Billé
By
James L. Norris
Atty.

UNITED STATES PATENT OFFICE.

LÉON BILLÉ, OF PARIS, FRANCE, ASSIGNOR OF ONE-HALF TO SOCIETE METALLURGIQUE DU PERIGORD, OF PARIS, FRANCE, A CORPORATION OF FRANCE.

PIPE-JOINT.

No. 928,896.  Specification of Letters Patent.  Patented July 20, 1909.

Application filed June 28, 1907. Serial No. 381,371.

*To all whom it may concern:*

Be it known that I, LÉON BILLÉ, citizen of the French Republic, residing at Paris, Department of the Seine, in the Republic of France, have invented certain new and useful Improvements in and Relating to Pipe-Joints, of which the following is a specification.

The invention has for its object a form of joint for pipes which comprises mechanical compression up to the point of the refusal of washers of india rubber (or other material) and of malleable metal in recesses formed on the inner periphery of the socket pipe in such a manner that these washers hold the fitted pipe in forming an hermetic joint; this compression is obtained by means of jacks acting upon a bearing collar and a compression collar. These collars and these jacks constitute an apparatus serving exclusively for making the joints and are then removed.

Figure 1:
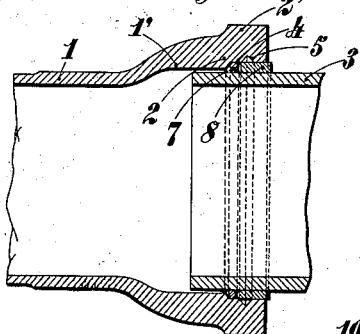
Figure 2:
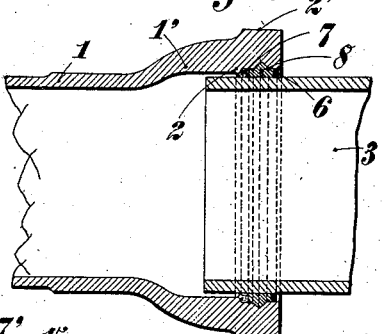
Figure 3:
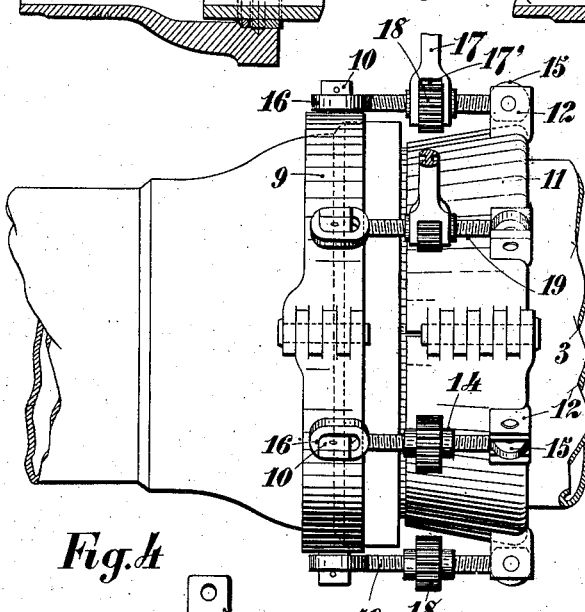
Figure 4:
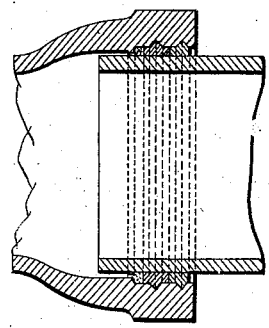
Figure 4:
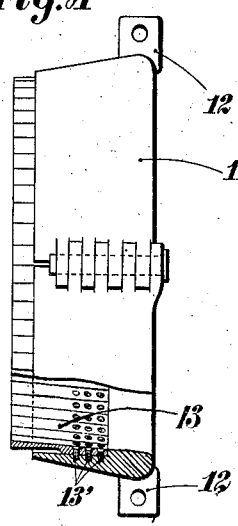
Figure 5:
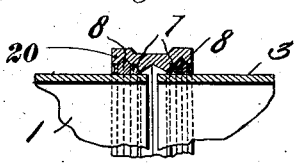
Figure 6:
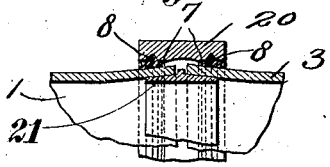

In the accompanying drawings: Figures 1 and 2 represent a section through a joint before and after the compression has been exerted. Fig. 2' is a sectional view similar to Fig. 2 showing a plurality of grooves in the pipe socket to receive a corresponding number of locking rings. Fig. 3 represents the tightening device. Fig. 4 shows the compression collar. Figs. 5 and 6 represent special joints.

The socket pipe 1 ends in a socket, on the bottom of which there is cast a shoulder 2; a pipe 3 of corresponding diameter is introduced into this socket. On the inner periphery of the socket and in front of the shoulder 2, there are formed a circular recess 4, 6, and one or more circular grooves 5 of any desired form (Figs. 1 and 2) but generally triangular in section. The bottom of the socket 1' is frusto-conical in form, in such a manner as to permit of slight bending of the pipes. In the cavity of the socket there are introduced in succession a washer of india rubber, asbestos, or other material 7, and a metal washer 8. This washer 8 may be of any metal or other malleable material, such as lead, zinc, copper, asphalt or the like.

For producing the compression of the washers 7 and 8 the device of the Figs. 3 and 4 may be utilized, in which device, a hinged collar 9 provided with lugs 10 surrounds the socket 1 and is adapted to bear upon the shoulder 2' of the socket. Another hinged collar 11 carrying the lugs 12 embraces the pipe 3. On the inner periphery of this collar projecting strips 13 are fixed by means of screws 13'. These strips are intended to enter the cavity 6, where they compress the washers. The double threaded jacks 14 serve to effect the tightening. The heads 15 are pivoted in the collar 11 on the lugs 12. The yokes 16 surround the lugs 10 to which they are keyed. By means of a spanner with a double fork 17 provided with a tooth 17', the nuts 18 with toothed surface are acted upon; by the intermediary of the screw threaded arms 19, these nuts bring the two collars 9 and 11 together. The collar 9 then bears upon the shoulder 2' of the socket, and the strips of the collar 11 enter the cavity 6, forcing the india rubber or other washers and the metal washers 7 and 8 respectively into the recesses 4 and 5 up to the point of refusal. The washer of india rubber or other material is compressed against the pipe 3 and forms one tight joint. The washer of malleable metal becomes deformed and enters the cavity intended for it completely under the influence of the compression and forms a counter flange which maintains the washer of india rubber or other material compressed, at the same time forming a second tight joint. The joint thus constituted presents the following advantages: Its resistance to wear is very great, the india rubber washer being completely protected by the lead washer; it is able to resist far higher pressure than an ordinary lead joint, because contrary to what is the case with ordinary lead joints, the pressure can only be exerted upon a very small annular surface. Finally the lead washer is caused by the compression to fit the groove and all the asperities of the pipe in a far more perfect manner than by ordinary upsetting. On the other hand this joint is very flexible and very elastic, which is of great importance for underground pipe systems which are constantly subjected to vibration of the ground.

It is of course possible to form more than one groove in the socket, in such a manner that several washers, alternately of india rubber and of metal, may be forced in as shown in Fig. 2'.

It is advisable to leave a certain amount of play to provide for expansion between the extremity of the male end and the bottom of the socket of the pipes. The joint might equally well be made by turning over the extremity of the male end so that the washers bear against this flange forming a shoulder or against a metal ring, bearing against the bottom of the socket or upon this shoulder; this shoulder or this metal ring may therefore replace the shoulder 2. In this manner greater resistance to tearing-away is obtained. Finally, for ordinary pipes without socket, the joint may be constituted by a ring 20 comprising two symmetrical sockets (Fig. 5) which are placed astride the two pipes. This ring is provided internally with recesses, into which washers are forced from both sides by tightening collars and jacks in the manner already described. In the case of pipes of less strength, of lead or copper for example, a reinforcing liner 21 (Fig. 6) may be provided internally between the two pipes, which are then pressed by the washers upon this liner without being deformed.

I claim as my invention:

1. A pipe joint comprising coöperating sections, one of the latter having an inner circumferential groove, a packing ring composed of relatively soft material interposed between the sections, and a locking ring interposed between the said sections behind said packing ring, the locking ring pressing against the packing ring with a pressure substantially equal to the limit of compressibility of the packing ring, the material of the locking ring being expanded laterally into said groove to lock the packing ring in compressed condition.

2. A joint comprising coöperating pipe sections, one of the latter having an annular shoulder surrounding a portion of the other section so as to provide an annular space between the surface of said shoulder and the opposite wall of the coöperating section; a packing ring or washer composed of elastic material interposed between the sections and having a reduced portion filling the annular space formed between said shoulder and the opposite wall of the coöperating section, and a locking ring of ductile metal inserted between the sections behind the packing ring, said locking ring bearing against the packing ring with a pressure equal to the limit of its compressibility, a portion of the material composing the locking ring protruding laterally into the said annular groove to lock the packing ring in compressed condition.

3. A pipe joint of the class described comprising a pair of confronting pipe sections, a reinforcing liner inserted within the confronting ends of said sections and supporting the same from collapsing, a supplemental pipe section composed of a ring surrounding the confronting ends of the sections first mentioned and provided with a pair of internal recesses, a pair of packing rings of yieldable material interposed between the said ring and the respective confronting ends of the pipe sections, and a corresponding pair of locking rings of ductile material arranged behind the respective packing rings, each locking ring pressing against its respective packing ring with a pressure substantially equal to the limit of compressibility of the packing ring, the material of the locking ring being expanded laterally into its respective recess in the supplemental section or ring to lock the packing ring in compressed condition.

4. A pipe joint comprising coöperating sections one fitting over the other, the outer section being provided with an internal annular groove of triangular cross-section, the outer section also having an annular shoulder adjacent to one side of said groove, a packing ring composed of relatively soft material interposed between said inner and outer sections and abutting against said shoulder of the outer section, and a locking ring uniformly compressed within the sides between the inner and outer sections and exerting a pressure against the packing ring, said locking ring being also expanded laterally under pressure into the said triangular groove to lock the packing ring in position to maintain said compression on the packing ring.

In testimony whereof I have hereunto set my hand in presence of two subscribing witnesses.

LÉON BILLÉ.

Witnesses:
 DEAN B. MASON,
 ENRIK KLOTZ.